(12) United States Patent
Tillotson

(10) Patent No.: US 11,131,685 B2
(45) Date of Patent: Sep. 28, 2021

(54) AIR DATA SYSTEM USING MAGNETICALLY INDUCED VOLTAGE

(71) Applicant: The Boeing Company, Chicago, IL (US)

(72) Inventor: Brian Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 223 days.

(21) Appl. No.: 16/413,465

(22) Filed: May 15, 2019

(65) Prior Publication Data

US 2020/0363444 A1  Nov. 19, 2020

(51) Int. Cl.
| | |
|---|---|
| *G01P 5/08* | (2006.01) |
| *G01F 1/60* | (2006.01) |
| *G01F 1/58* | (2006.01) |
| *G01P 13/02* | (2006.01) |

(52) U.S. Cl.
CPC ............. *G01P 5/083* (2013.01); *G01F 1/588* (2013.01); *G01F 1/60* (2013.01); *G01P 13/025* (2013.01)

(58) Field of Classification Search
None
See application file for complete search history.

(56) References Cited

U.S. PATENT DOCUMENTS

| | | | |
|---|---|---|---|
| 2,679,162 A | 5/1954 | Stuart | |
| 5,001,638 A * | 3/1991 | Zimmerman | G05D 1/0077 244/194 |
| 6,134,485 A * | 10/2000 | Tanielian | G01D 21/02 244/17.13 |
| 7,463,341 B2 | 12/2008 | Halldorsson et al. | |
| 7,495,774 B2 | 2/2009 | Hays et al. | |
| 8,256,284 B2 | 9/2012 | Vozhdaev et al. | |
| 8,434,358 B2 | 5/2013 | Asahara et al. | |
| 10,352,813 B2 | 7/2019 | Cooper et al. | |
| 10,444,367 B2 | 10/2019 | Lodden et al. | |

(Continued)

FOREIGN PATENT DOCUMENTS

| | | |
|---|---|---|
| JP | S539149 A | 1/1978 |
| JP | S5394971 A | 8/1978 |

(Continued)

OTHER PUBLICATIONS

European Patent Office, Extended European Search Report Issued in Application No. 20201179.7, dated Mar. 9, 2021, Germany, 10 pages.

*Primary Examiner* — Harshad R Patel
(74) *Attorney, Agent, or Firm* — Alleman Hall Creasman & Tuttle LLP

(57) ABSTRACT

An air data system for measuring an airspeed includes a pair of electrodes, and one or more magnets arranged relative to the pair of electrodes. The pair of electrodes includes a first electrode and a second electrode spaced apart from the first electrode along a first dimension by an air gap. The one or more magnets produce a magnetic field within the air gap. The air data system further includes an electronic circuit interfacing with the pair of electrodes. The electronic circuit outputs a voltage difference measured between the pair of electrodes across the air gap. A magnitude of the voltage difference indicates a magnitude of an air stream velocity through the air gap.

20 Claims, 9 Drawing Sheets

(56) References Cited

U.S. PATENT DOCUMENTS

| | | | |
|---|---|---|---|
| 2002/0088219 A1* | 7/2002 | Meholic | F02K 7/06 |
| | | | 60/204 |
| 2010/0108821 A1* | 5/2010 | Lewis | B64C 23/005 |
| | | | 244/205 |
| 2010/0313675 A1* | 12/2010 | Goegge | G01F 1/588 |
| | | | 73/861.12 |
| 2012/0078540 A1 | 3/2012 | McIntyre | |
| 2014/0144517 A1 | 5/2014 | Raja et al. | |
| 2019/0226890 A1* | 7/2019 | Kung | G01F 22/00 |

FOREIGN PATENT DOCUMENTS

| | | |
|---|---|---|
| JP | S53147759 U | 11/1978 |
| JP | H01302116 A | 12/1989 |
| KR | 101726370 B1 | 4/2017 |

* cited by examiner

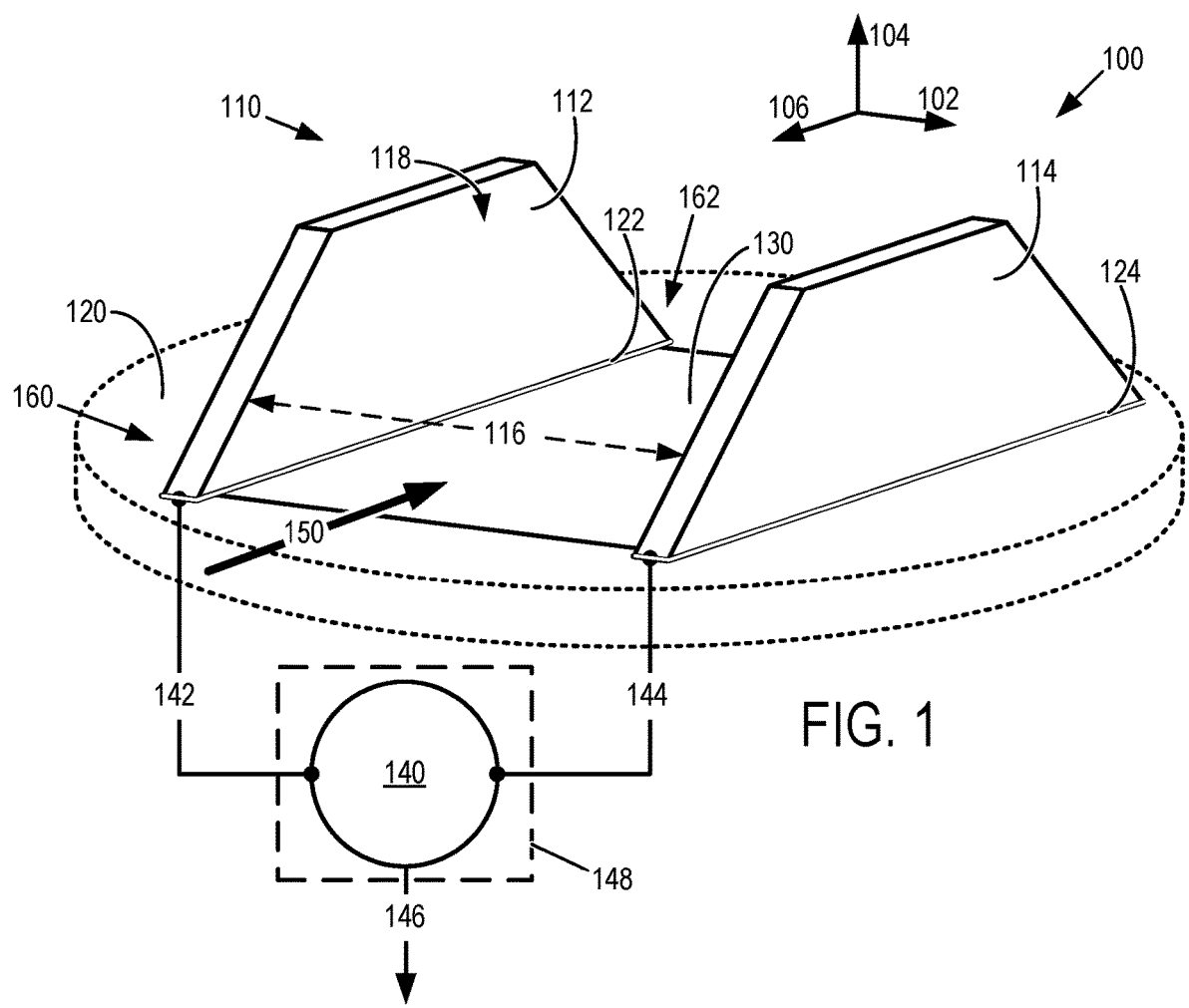
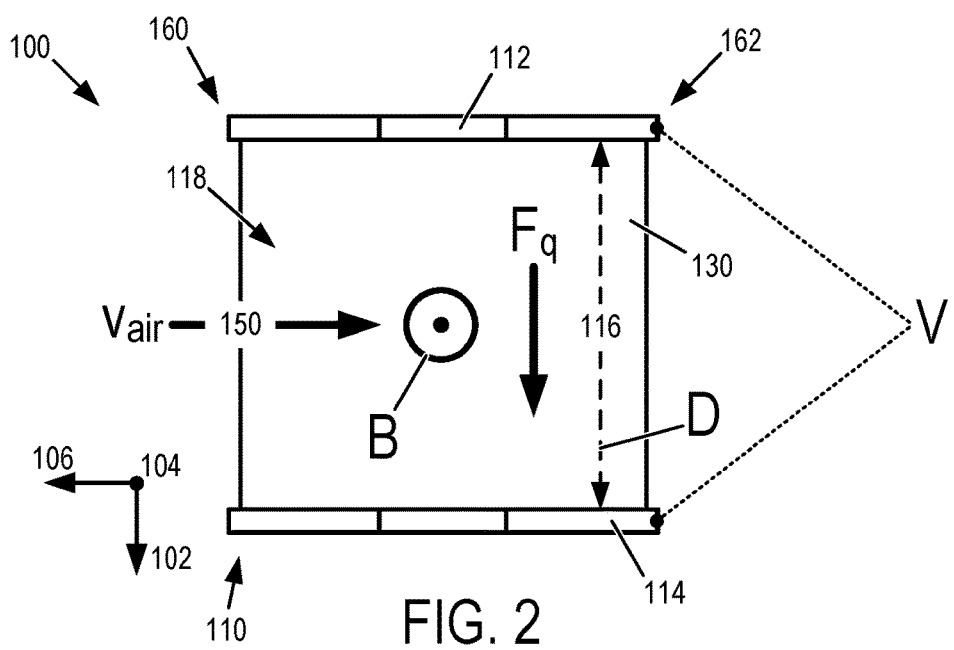

AIR DATA SYSTEM USING MAGNETICALLY INDUCED VOLTAGE

FIELD

The invention relates generally to an air data system capable of measuring an airspeed of an aeronautical vehicle.

BACKGROUND

Aircraft commonly measure airspeed via measurement devices located on board the aircraft. The measured airspeed may be presented via an airspeed indicator, used by an auto-pilot system to control operation of the aircraft, or stored in an electronic flight recorder system, for example. Pitot tubes and Doppler Light Detection and Ranging (LIDAR) are two such measurement devices that are used to measure airspeed. The inventor has recognized that using these measurement devices to measure airspeeds under certain conditions, such as at extremely high speeds and/or at extremely high altitudes, can present challenges. For example, while Pitot tubes are reliable at the subsonic speeds of commercial aviation, some Pitot tube designs are susceptible to overheating from friction with colliding air at supersonic and hypersonic speeds. Further, LIDAR faces challenges measuring airspeeds at extremely high altitudes, where particles in the air are scarce, since LIDAR relies upon detection of laser light that has been scattered by particulates in the air or air molecules to perform measurement. These challenges pose barriers to the continued development of airspeed measurement devices, particularly when considering the possibility for aircraft engaged in commercial aviation to fly at ever faster speeds and higher altitudes in the future. Further, the inventor has also recognized that even at low altitudes and slower airspeeds, air data systems generally face the continued challenge of robustly delivering accurate airspeed data even when adverse conditions develop in-flight that may affect the performance of these types of airspeed measurement devices.

SUMMARY

According to an example of the present disclosure, an air data system includes a pair of electrodes, and one or more magnets arranged relative to the pair of electrodes. The pair of electrodes includes a first electrode and a second electrode spaced apart from the first electrode along a first dimension by an air gap. The one or more magnets produce a magnetic field within the air gap. The air data system further includes an electronic circuit interfacing with the pair of electrodes. The electronic circuit outputs a voltage difference measured between the pair of electrodes across the air gap. A magnitude of the voltage difference indicates a magnitude of an air stream velocity through the air gap.

According to another example of the present disclosure, an aeronautical vehicle incorporates the above described air data system. The air data system may be mounted to the aeronautical vehicle, such as an aircraft to provide a measurement of airspeed of the aeronautical vehicle. The aeronautical vehicle may be a supersonic or hypersonic aeronautical vehicle, in an example.

According to another example of the present disclosure, a method of operating an air data system is provided. The method includes producing, via one or more magnets, a magnetic field within an air gap between a pair of electrodes. A voltage difference between the pair of electrodes is measured across the air gap. The magnitude of the voltage difference is converted to a magnitude of an air stream velocity through the air gap. The magnitude of the air stream velocity is output, as an example, to one or more of an airspeed indicator, an auto-pilot system, and/or an electronic flight recorder system.

The features and techniques that have been discussed can be provided independently in various embodiments or may be combined in yet other embodiments, further details of which are described in further detail with reference to the following description and drawings.

BRIEF DESCRIPTION OF THE DRAWINGS

FIG. 1 is an illustration depicting an example air data system.

FIG. 2 depicts example vectors for a magnetic field, a magnetic force, and an air stream in relation to the air data system of FIG. 1.

DETAILED DESCRIPTION

Figure 3A:
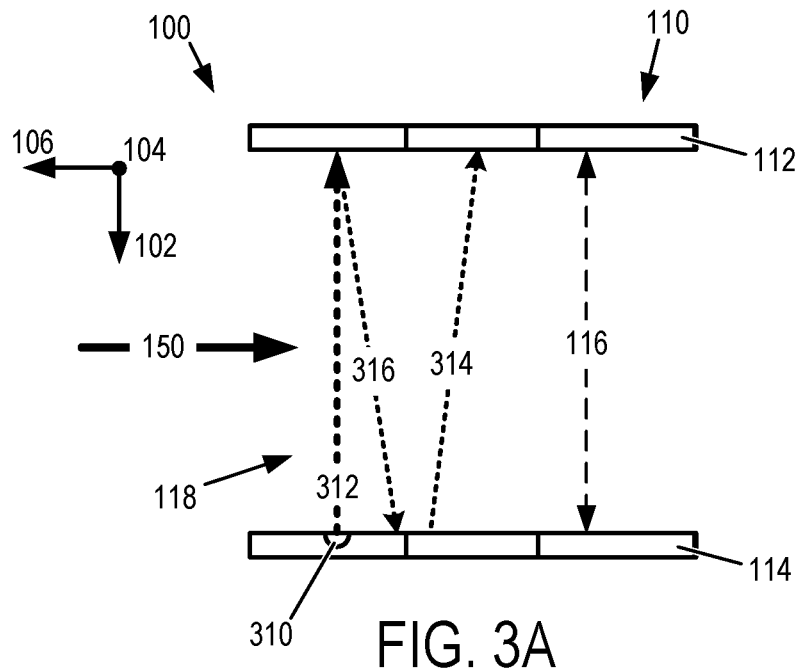
FIGS. 3A-3E are schematic representations of the air data system with example conductive path sources that increase an electrical conductivity across the air gap between the pair of electrodes.

An air data system is disclosed, an example configuration of which contains a set of one or more magnets that magnetically induces a voltage between a pair of electrodes to measure an air stream velocity through an air gap formed between the pair of electrodes. This air data system may be suitable for measuring airspeed on board high-altitude, supersonic and hypersonic aeronautical vehicles, as well as subsonic aeronautical vehicles or on other devices and at other locations where air data regarding airspeed is desired.

The example configurations of the air data system disclosed herein may be used, for example, to address issues with existing airspeed measurement devices such as Pitot tubes and LIDAR. As discussed briefly above, the inventor has recognized that Pitot tubes may overheat or provide inaccurate airspeed measurements at supersonic and hypersonic airspeeds. In addition, there are other adverse conditions, such as icing, debris clogging, and impacts from bird strikes or other objects, which can adversely affect Pitot tube performance. Also as discussed above, the inventor has recognized that at higher altitudes, particulates in the air become scarce, thereby limiting the accuracy or effectiveness of conventional LIDAR systems at these altitudes. Specialized LIDAR systems that are capable of scattering light from individual air molecules in the absence of particulates offer a possible technical solution to high-altitude airspeed measurement but suffer from the drawback that they are large, heavy, and costly to deploy.

By magnetically inducing a voltage between a pair of electrodes to measure an air stream velocity, the configurations of the air data system disclosed herein may address some or all of these potential issues identified with respect to conventional airspeed measurement devices. One or more of the various air data system configurations disclosed herein may provide potential advantages in reliability, accuracy, size, weight, and cost for various applications including high-altitude and/or high airspeed flight, as compared to conventional devices.

FIG. 1 is an illustration depicting an example air data system 100. Air data system 100 includes a pair of electrodes 110, including a first electrode 112 and a second electrode 114. Second electrode 114 is spaced apart from first electrode 112 along a first dimension 116 by an air gap 118. First dimension 116 is parallel to a width axis 102 of air data system 100. Accordingly, first dimension 116 may also be referred to herein as a width dimension of air gap 118. In an example, first dimension 116 represents a shortest path across air gap 118 between the pair of electrodes 110.

Figure 7:
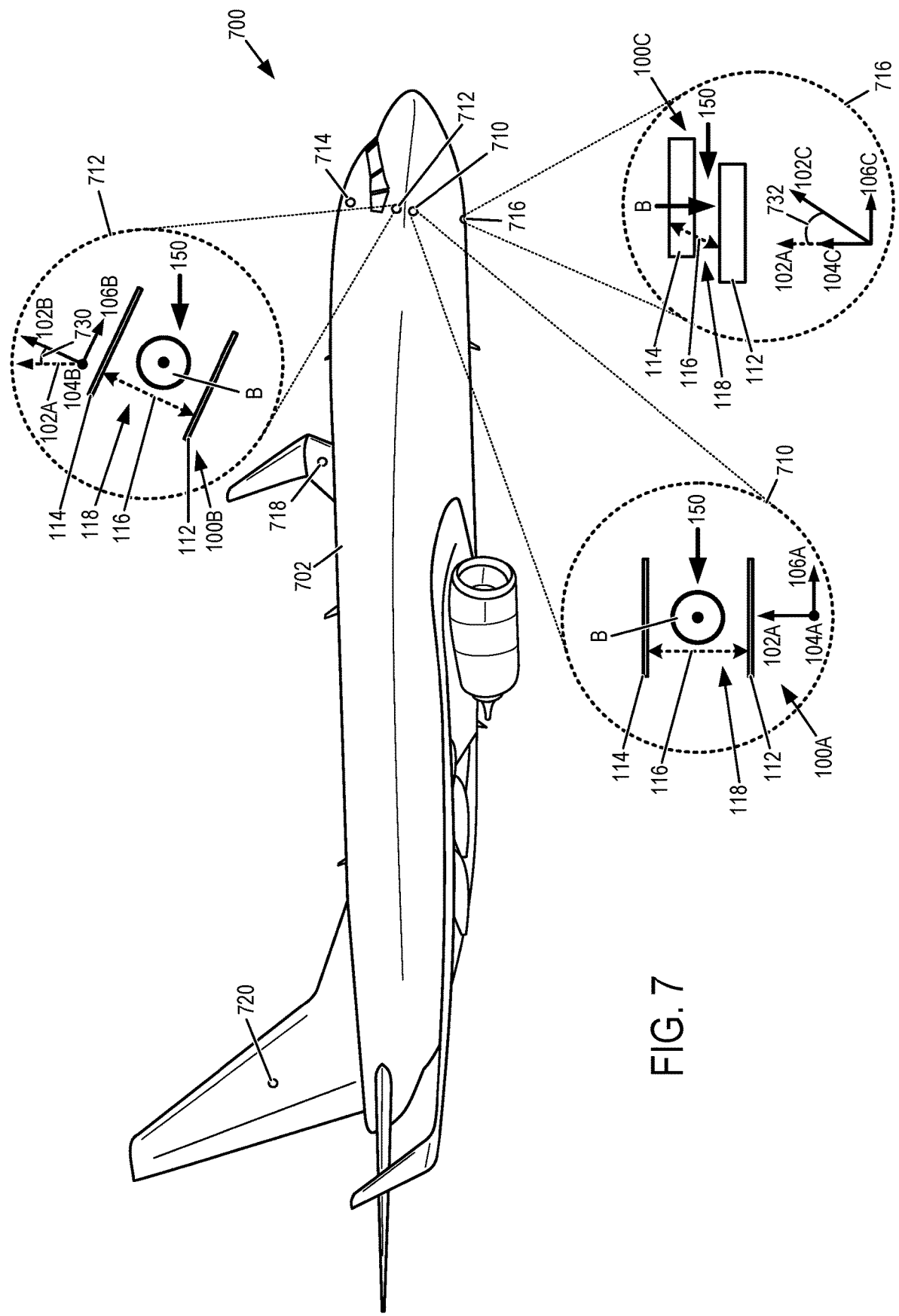
FIG. 7 is an illustration of an example aeronautical vehicle incorporating multiple instances of the air data system.

In the example depicted in FIG. 1, first electrode 112 and second electrode 114 project outward from an exterior surface of a body 120 along a height axis 104, which is orthogonal to width axis 102. For example, the pair of electrodes 110 each form a fin, and are parallel to each other. However, the pair of electrodes 110 may have other configurations as described in further detail herein. For example, the pair of electrodes 110 may form a fin having a different shape or may be flush-mounted with an exterior surface of body 120 that adjoins or surrounds the pair of electrodes. Body 120 may form part of an object, such as an airframe of an aeronautical vehicle or other suitable structure. FIG. 7 depicts an example of an aeronautical vehicle that incorporates air data system 100.

Air data system 100 includes a set of one or more magnets 130 arranged relative to the pair of electrodes 110. The set of magnets 130 may include one or more permanent magnets having a persistent magnetic field and/or one or more electro-magnets that produce a magnetic field upon application of an electric current. The set of magnets 130 produce a magnetic field within air gap 118. The magnetic field produced by the set of magnets 130 induces a voltage between the pair of electrodes 110 that is dependent on a velocity of an air stream 150 flowing through air gap 118.

In the example depicted in FIG. 1, the set of magnets 130 are arranged along first dimension 116 on a first side (lower side) of air gap 118 shared with the exterior surface of body 120. The set of magnets 130 may form at least a portion of a boundary of air gap 118 along first dimension 116 between the pair of electrodes 110. As an example, the set of magnets 130 may be flush-mounted with the exterior surface of body 120 that surrounds the set of magnets as measured along height axis 104. However, the set of magnets 130 may have other configurations as described in further detail herein. For example, the set of magnets 130 may be located beneath an exterior surface of body 120 or may be located above the exterior surface of body 120 as measured along height axis 104. Flush-mounted features, including the magnets and the electrodes of the air data system configurations disclosed herein may reduce drag, reduce heating at supersonic or hypersonic speeds, and reduce or eliminate damage caused to the air data system by impact events as compared to features that project outward from an exterior surface of body 120.

Air data system 100 includes an electronic circuit 140, represented schematically in FIG. 1. Electronic circuit 140 may form part of a control subsystem 148 of air data system 100. An example control subsystem is described in further detail with reference to FIG. 8. Electronic circuit 140 interfaces with first electrode 112 and second electrode 114 via electrically conductive pathways 142 and 144, respectively. First electrode 112 and second electrode 114 are formed from an electrically conductive material, such as steel, copper, or other suitable electrically conductive material or combination of materials. In at least some examples, first electrode 112 is electrically isolated from body 120 and/or the set of magnets 130 by a first insulator 122, and second electrode 114 is electrically isolated from body 120 and/or the set of magnets 130 by a second insulator 124. Insulators for electrically isolating electrodes may not be used in some examples, such as where portions of body 120 that are in contact with the electrodes are formed from an electrically insulative material.

Electronic circuit 140 outputs a voltage difference 146 measured between first electrode 112 and second electrode 114 across air gap 118. A magnitude of voltage difference 146 output by electronic circuit 140 indicates a magnitude of the velocity of air stream 150 through air gap 118. In the example depicted in FIG. 1, air stream 150 flows through air gap 118 from an upstream side 160 towards a downstream side 162 of air data system 100 along a length axis 106, which is orthogonal to previously described width axis 102 and height axis 104. Voltage difference 146 or a signal indicating or representing a magnitude of a velocity of air stream 150 may be output to one or more instruments (e.g., an airspeed indicator), an auto-pilot system, an electronic flight recording system, or other suitable component.

FIG. 2 depicts example vectors for a magnetic field, a magnetic force, and an air stream in relation to air data system 100 of FIG. 1. Features of air data system 100 are depicted in a plan view in FIG. 2. Air stream 150 having a velocity vector "$v_{air}$" flows parallel to length axis 106 through air gap 118 from upstream side 160 toward downstream side 162 of air data system 100. The set of magnets 130 produces a magnetic field within air gap 118 represented in FIG. 2 by an example magnetic field vector "B". The magnetic field vector "B" in this example points along height axis 104 out of the page in this example.

The magnetic field produced by the set of magnets 130 exerts a magnetic force represented by a magnetic force vector "$F_q$" on a free charge "q" moving with air stream 150, resulting in a voltage difference "V" being induced between first electrode 112 and second electrode 114. The magnetic force vector "$F_q$" may be represented by the following equation: $F_q=(q)v_{air} \times B$, where "×" represents the cross product of the velocity vector "$v_{air}$" and the magnetic field vector "B". The voltage difference "V" may be represented by the following equation: $V=\int_{D1}^{D2}(v_{air}(D) \times B(D)) \cdot dD$, where "D" represents a vector distance of first dimension 116 between first electrode 112 and second electrode 114, "·" represents a vector product, "×" represents a vector cross product, and "V" is the dot product of "$v_{air}$"×"B" integrated over the distance "D".

In a simplified example where the velocity vector "$v_{air}$", the magnetic field vector "B", and distance "D" are each orthogonal to each other, and where the velocity vector "$v_{air}$" and the magnetic field vector "B" each have uniform distributions of magnitude across first dimension 116 over distance "D", the magnetic force "$F_q$" may be represented in simplified form as the product of "D", "$v_{air}$", and "B" by the following equation: $V=(D)(v_{air})(B)$. Continuing with this simplified example, given the velocity vector "$v_{air}$" having a magnitude of 1,000 meters per second, the magnetic field vector "B" having a magnitude of 1.0 Tesla, and distance "D" between electrodes of 0.1 meters, the voltage difference "V" is 100 volts.

In view of the above description, as a magnitude of the velocity vector "$v_{air}$" of air stream 150 increases, a magnitude of the voltage difference "V" will also increase, assuming a constant direction of the velocity vector and a constant electrical conductivity across air gap 118. As another example, as a direction of the velocity vector "$v_{air}$" of air stream 150 changes, a magnitude of the voltage difference "V" will also change, assuming a constant magnitude of the velocity vector "$v_{air}$" and a constant electrical conductivity across air gap 118. The magnetic field produced by the set of magnets 130 may have a magnetic field vector "B" of different directionality from that depicted in FIG. 2, depending on the arrangement of the set of magnets 130. For example, the set of magnets 130 will induce a different voltage between first electrode 112 and second electrode 114 if the magnetic field vector "B" is not orientated orthogonal to both first dimension 116 and to air stream 150, but merely includes a vector component that is orthogonal to first dimension 116 and to air stream 150.

In practice, air data system 100 having a particular configuration may be calibrated through testing across a range of air stream velocities (both in terms of a magnitude and a direction of the air stream) at a desired resolution to observe the voltage difference response by the air data system across the pair of electrodes 110. A relationship observed between the applied air stream velocity and the resulting voltage difference "V" by air data system 100 may be represented by a calibration function, map, lookup table, or specifically configured electronic hardware configuration that is used to convert a measured voltage difference across the pair of electrodes 110 to a calibrated air stream velocity during operation of the air data system or other instances of the air data system.

As described above, the magnetic force vector ($F_q$) may be represented as a function of the free charge (q) moving with air stream 150. This free charge (q) may be provided by background levels of ions and electrons carried by the air stream from cosmic ray particles, radon gases produced by the earth, or other sources. Free charges carried by the air stream at sufficient background levels may create natural conductive paths across air gap 118 between the pair of electrodes 110.

Conductive paths may be created by air data system 100 in at least some examples to increase the electrical conductivity across air gap 118 between the pair of electrodes 110. A static voltage imposed on a pair of electrodes will typically decay as charge seeps away from the electrodes. By increasing the electrical conductivity between the pair of electrodes 110 across air gap 118, the decay in voltage may be reduced or eliminated, enabling the magnetic force ($F_q$) imposed by the set of magnets 130 to drive charge onto the pair of electrodes to maintain the voltage difference "V". FIGS. 3A-3E depict additional aspects of air data system 100 that create conductive paths to increase an electrical conductivity across air gap 118 between the pair of electrodes 110.

In FIG. 3A, air data system 100 includes at least one conductive path source 310 that produces a conductive path 312 across at least a portion of an air gap 118 between first electrode 112 and second electrode 114. In the example depicted in FIG. 3A, source 310 is arranged at second electrode 114, and directs conductive path 312 toward first electrode 112 across air gap 118 through which air stream 150 flows. In at least some examples, conductive path 312 produced by source 310 spans the entirety of first dimension 116 of air gap 118 for at least a period of time. Source 310 may be operated continuously, periodically, or intermittently depending on the type of conductive path 312 produced by source 310, the desired air velocity measurement frequency, and other operating conditions. Measurements of the voltage difference between first electrode 112 and second electrode 114 may be coordinated in time with the production of conductive path 312 by conductive path source 310 to thereby measure the voltage difference while the conductive path contributes to an increase in the electrical conductivity between the electrodes.

Source 310 may take various forms, including one or more of an electro-magnetic radiation emitter, an ionizing radiation emitter, and/or an electron beam emitter. Examples of an electro-magnetic radiation emitter include a laser, a microwave emitter, an ultraviolet or far-ultraviolet lamp or light emitting diode (LED), etc. In an example, a laser may provide a laser-induced plasma channel (LIPC). An LIPC contains a large population of ions and free electrons that conducts electricity for at least a few milliseconds. The laser may take the form of a short-pulse laser that creates a series of LIPCs across air gap 118 between first electrode 112 and second electrode 114. A femtosecond laser may be used to fire a pulse, creating an LIPC in an air stream flowing through air gap 118 between the pair of electrodes 110, as an example.

Examples of an ionizing radiation emitter include a portion of a radioisotope that emits alpha or beta particles. The alpha and beta particles leave a large population of ions and free electrons along their paths when traveling through air. Ion trails created by the alpha and beta particles may persist for at least a few milliseconds, conducting current between the pair of electrodes 110. It will be understood that some forms of electromagnetic radiation (e.g., ultraviolet and higher frequencies) may also take the form of ionizing radiation, and that some forms of ionizing radiation may also take the form of electromagnetic radiation. Accordingly, conductive path source 310 may emit a combination of electromagnetic radiation and ionizing radiation as conductive path 312.

In at least some examples, previous instances of conductive path 312 produced by source 310 may drift downstream with air stream 150 as an ion trail 314 within air gap 118. Instances of conductive path 312 that drift downstream, such as ion trail 314 may continue to increase the electrical conductivity across air gap 118. Furthermore, in at least some examples, a portion of the ionizing radiation that produces conductive path 312 may be reflected from one or more of first electrode 112 and/or second electrode 114 as a reflected conductive path 316. Reflected conductive path 316 may further increase electrical conductivity across air gap 118 between the pair of electrodes 110.

An orientation of conductive path 312 relative to first dimension 116 may be selected so that the conductive path is directed along a desired axis or distributes the conductive path over a desired region of an electrode or air gap 118. In an example, source 310 directs conductive path 312 along an axis that is parallel to first dimension 116. In another example, source 310 directs conductive path 312 along an axis that is angled relative to first dimension 116.

Figure 3B:
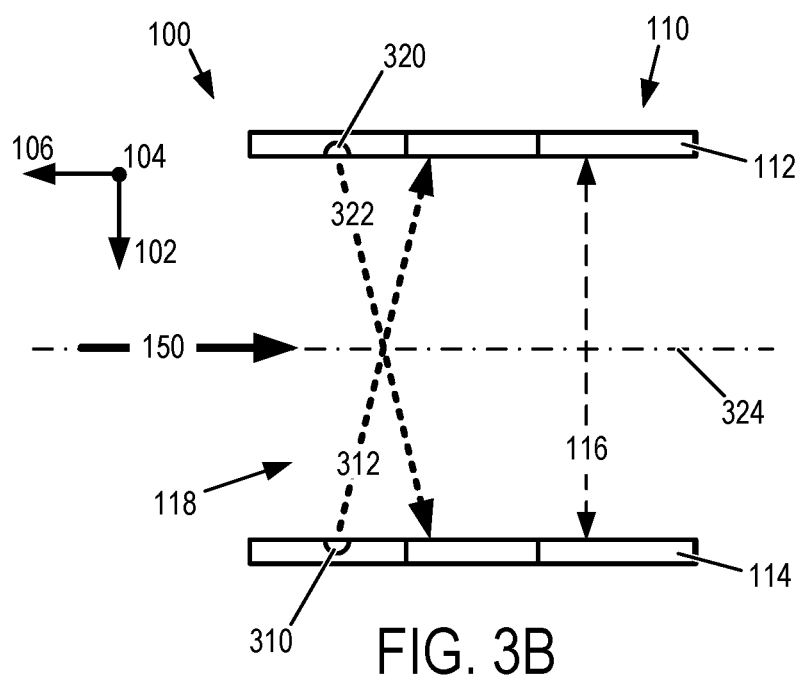

In FIG. 3B, another instance of previously described conductive path source 310 is included in air data system 100 as a second conductive path source 320. Source 320 produces a conductive path 322 across at least a portion of air gap 118 between first electrode 112 and second electrode 114. In the example depicted in FIG. 3B, source 320 opposes source 310 so that each source directs a conductive path at an opposing electrode of the pair of electrodes 110. A charge transported to first electrode 112 by particles that produce conductive path 312 emitted by source 310, may be orders of magnitude smaller than a charge carried by magnetically-driven current of the set of magnets 130. However, for applications that provide heightened precision, a conductive path source (e.g., an isotope source) may be provided for each electrode, such as depicted in the example of FIG. 3B with respect to sources 310 and 320. In this configuration, the charge transported between the pair of electrodes 110 by emitted particles that produce conductive paths 312 and 322 may be the same in both directions, thereby equalizing charge transport across air gap 118. FIG. 3B additionally depicts an example in which an axis of conductive paths 312 and 322 are each angled relative to a first dimension 116. The angle of conductive paths 312 and 322 may be symmetric about a midplane 324 of air data system 100 that is orthogonal to first dimension 116 in an example.

Figure 3C:
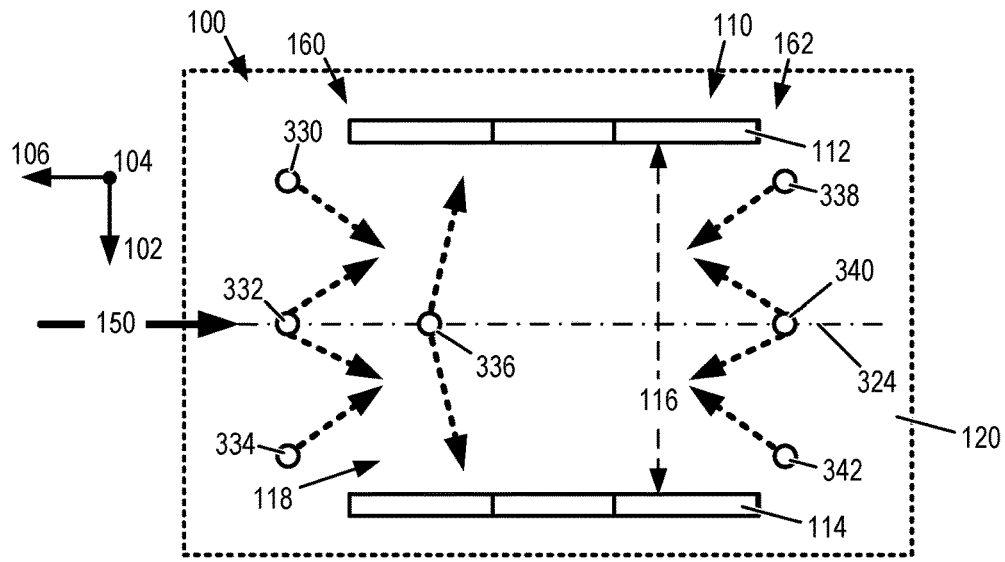

In FIG. 3C, features of air data system 100 are depicted with example conductive path sources 330-342 having a variety of different arrangements relative to the pair of electrodes 110 and air gap 118. Sources 330, 332, and 334 are located on upstream side 160 of air gap 118. Sources 330, 332, and 334 each produce and direct one or more conductive paths into air gap 118. Source 332 located along midplane 324 produces two conductive paths that are directed at first electrode 112 and second electrode 114, for example. Source 336 is located between first electrode 112 and second electrode 114 along midplane 324. Source 336 produces and directs a first conductive path at first electrode 112 and a second conductive path at second electrode 114. Sources 338, 340, and 342 are located on a downstream side 162 of air gap. Each of sources 338, 340, and 342 produce and direct one or more conductive paths into air gap 118. Source 340 located along midplane 324 produces two conductive paths that are directed at first electrode 112 and second electrode 114, for example. Sources 330-342 may be flush mounted with an exterior surface of body 120 in at least some examples, thereby remaining outside of a path of air stream 150 flowing through air gap 118.

Figure 3D:
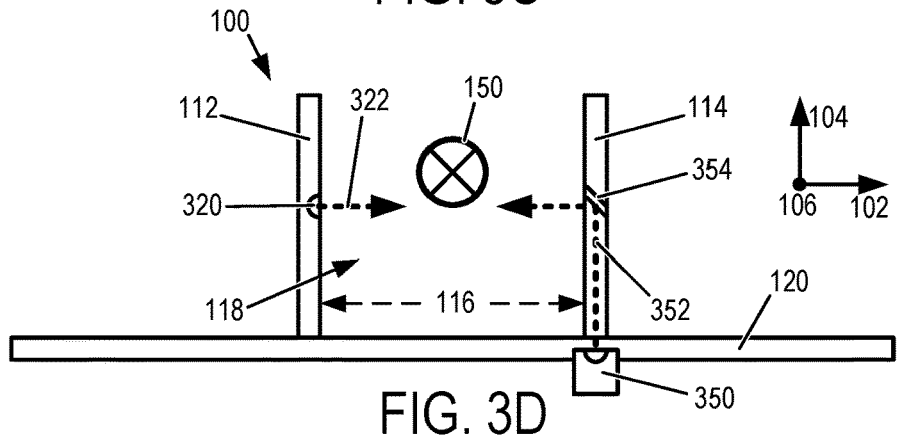

In FIG. 3D, features of air data system 100 are depicted along length axis 106 in a flow direction of air stream 150. In this example, first electrode 112 and second electrode 114 each project outward along height axis 104 from an exterior surface of body 120. Conductive path source 320 is depicted at first electrode 112 producing conductive path 322 at an example height above the exterior surface of body 120. Another example conductive path source 350 is located at or below an exterior surface of body 120 as measured along height axis 104. A conductive path 352 produced by source 350 travels along a path within second electrode 114 before being reflected or redirected into air gap 118 and toward first electrode 112 by an element 354. Element 354 may take the form of an optical element, such as a mirror or light guide, as examples.

Figure 3E:
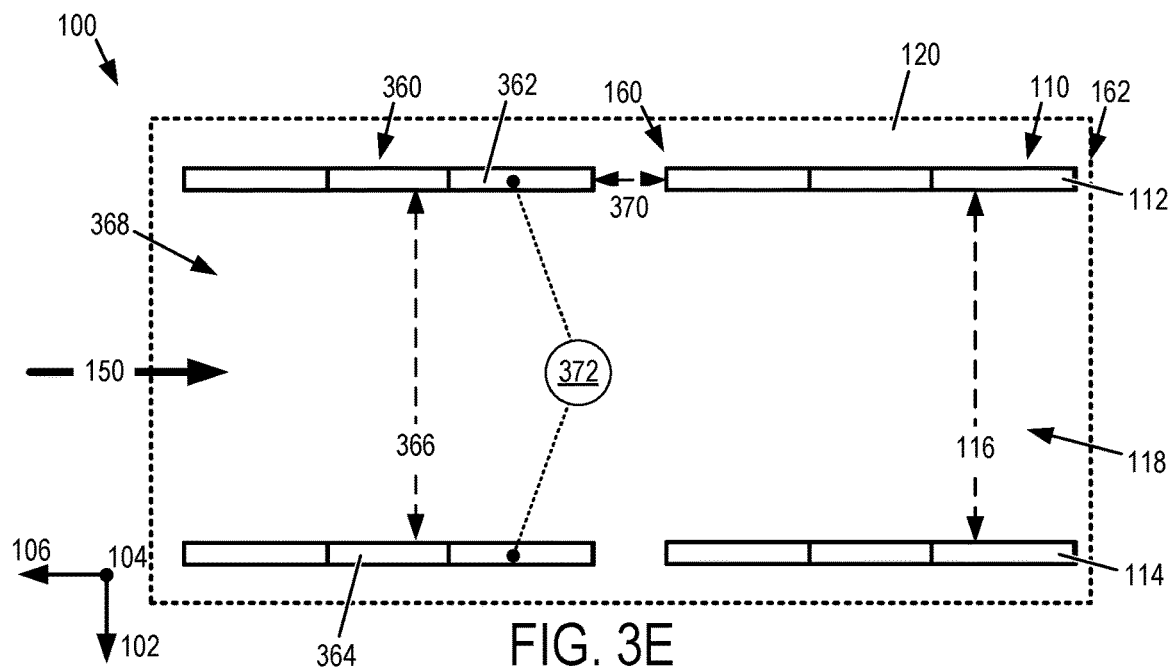

A conductive path may be alternatively or additionally produced within air gap 118 by applying a voltage across a second pair of electrodes located upstream of the air gap and the pair of electrodes 110 across which the voltage difference is to be measured. In FIG. 3E, features of air data system 100 are depicted in a plan view further including a second pair of electrodes 360 arranged on an upstream side 160 of air gap 118 in a second dimension 370 that is orthogonal to first dimension 116. The second pair of electrodes 360 includes a first electrode 362 and a second electrode 364 that is spaced apart from first electrode 362 along a width dimension 366 by an air gap 368. In this example, width dimension 366 is parallel to first dimension 116. A distance between the second pair of electrodes 360 along width dimension 366 may be the same as or may differ from a distance between the pair of electrodes 110 along first dimension 116. A voltage source 372 in electrical contact with the second pair of electrodes 360 may be used to apply a second voltage difference to the second pair of electrodes. This voltage difference may be used to increase an electrical conductivity between first electrode 112 and second electrode 114 through the air gap 118 as air stream 150 flows from the second pair of electrodes 360 located on the upstream side 160 of air gap 118. In an example, the second voltage difference may be applied to the second pair of electrodes 360 as direct current or may incorporate a Tesla coil to accommodate the use of alternating current to produce the second voltage difference.

Figure 4A:
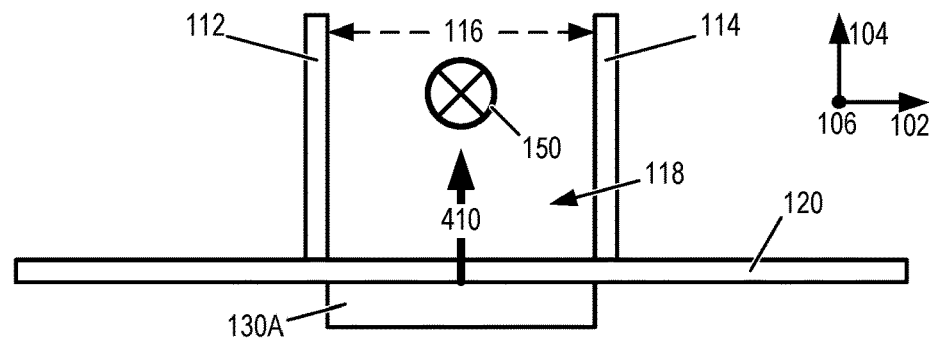
FIGS. 4A-4H are schematic representations of example electrode and magnet configurations for the air data system.

FIGS. 4A-4I depict further examples of electrode and magnet configurations for air data system 100. In FIG. 4A, features of air data system 100 are depicted along length axis 106 in a flow direction of air stream 150. In this example, first electrode 112 and second electrode 114 each project outward along height axis 104 from an exterior surface of body 120. As an example of the previously described set of magnets 130, a set of one or more magnets 130A are arranged on a side of air gap 118 that is shared with body 120. For example, the set of magnets 130A are arranged below an exterior surface of body 120 in relation to air gap 118. An example magnetic field vector 410 is produced by the set of magnets 130A within air gap 118. Magnetic field vector 410 is parallel to height axis 104 in this example, and is orthogonal to both first dimension 116 and air stream 150 in this example.

Figure 4B:
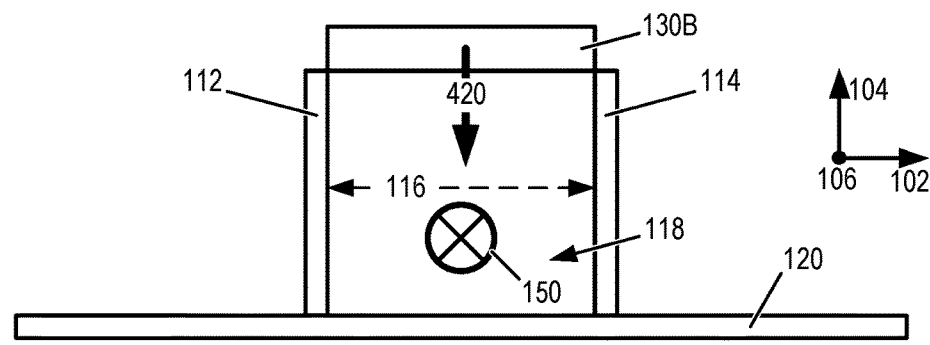

In FIG. 4B, features of air data system 100 are depicted along length axis 106 in a flow direction of air stream 150. In this example, the previously described set of one or more magnets 130 are arranged on an opposite side of air gap 118 from body 120, as depicted by the example set of one or more magnets 130B. An example magnetic field vector 420 is produced by the set of magnets 130B within air gap 118 Magnetic field vector 420 is again parallel to height axis 104, and is orthogonal to both first dimension 116 and air stream 150 in this example.

Figure 4C:
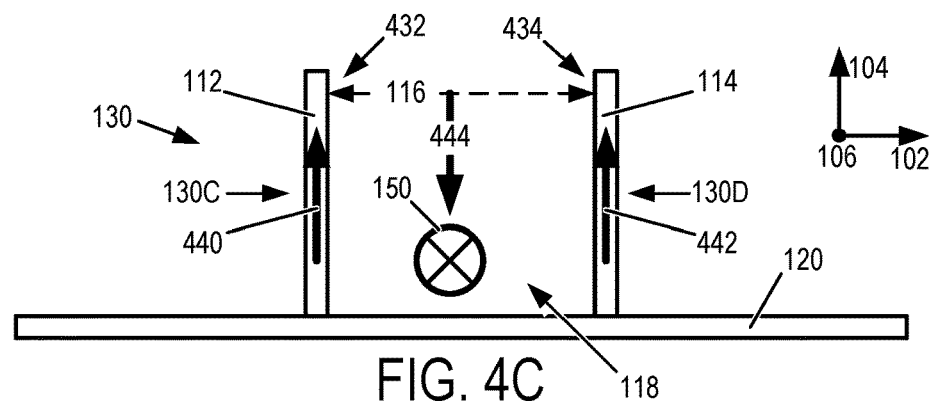

In FIG. 4C, features of air data system 100 are depicted along length axis 106 in a flow direction of air stream 150. In this example, the set of one or more magnets 130 includes a first subset of one or more magnets 130C integrated with first electrode 112 to form a first combined magnet-electrode 432. The set of one or more magnets 130 further includes a second subset of one or more magnets 130D integrated with second electrode 114 to form a second combined magnet-electrode 434. First combined magnet-electrode 432 and second combined magnet-electrode 434 each project outward along height axis 104 from an exterior surface of body 120. The first subset of magnets 130C producing a first magnetic field vector 440 and the second subset of magnets 130D producing a second magnetic field vector 442 are arranged on opposite sides of air gap 118. Within air gap 118, a resultant magnetic field vector 444 is formed by a combination of magnetic field vectors 440 and 442. Resultant magnetic field vector 444 is parallel to height axis 104, and is orthogonal to both first dimension 116 and air stream 150 in this example.

Figure 4D:
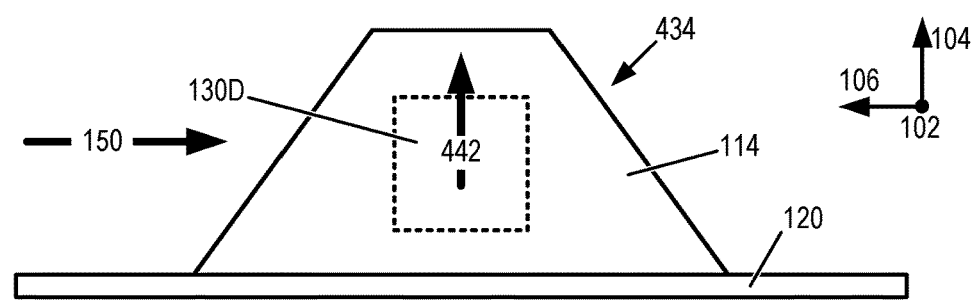

In FIG. 4D, second combined magnet-electrode 434 of FIG. 4C is depicted in a profile view, including an example configuration of second electrode 114 and the second subset of magnets 130D. In an example, first combined magnet-electrode 432 is similarly configured as second combined magnet-electrode 434 depicted in FIG. 4D.

Figure 4E:
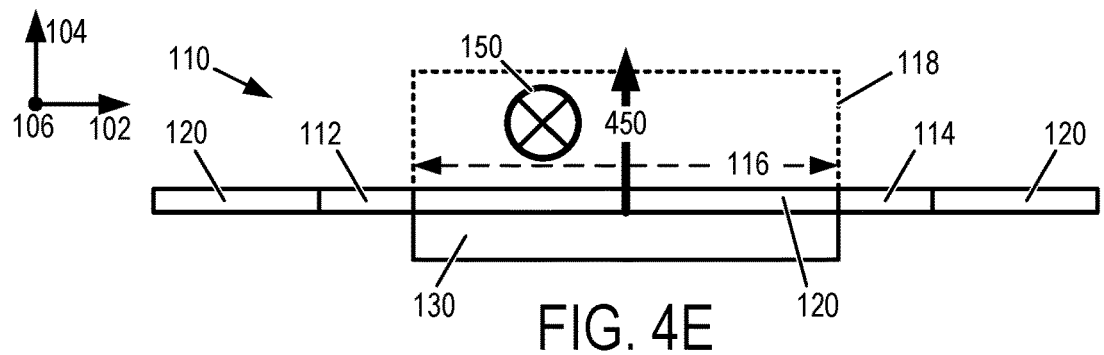

In FIG. 4E, features of air data system 100 are depicted along length axis 106 in a flow direction of air stream 150. In this example, first electrode 112 and second electrode 114 are flush-mounted with an exterior surface of a body 120 that adjoins or surrounds the electrodes as measured along height axis 104. The set of magnets 130 are located beneath an exterior surface of body 120 relative to air gap 118 as measured along height axis 104. The set of magnets 130 may alternatively be flush-mounted with an exterior surface of body 120 and/or the pair of electrodes 110. Flush mounted features of air data system 100, including the pair of electrodes 110 and/or the set of magnets 130 may reduce drag, reduce heating at supersonic or hypersonic speeds, and reduce or eliminate damage caused by impact events. An example magnetic field vector 450 is produced by the set of magnets 130 within air gap 118. In this example, magnetic field vector 450 is orthogonal to both first dimension 116 and to air stream 150.

Figure 4F:
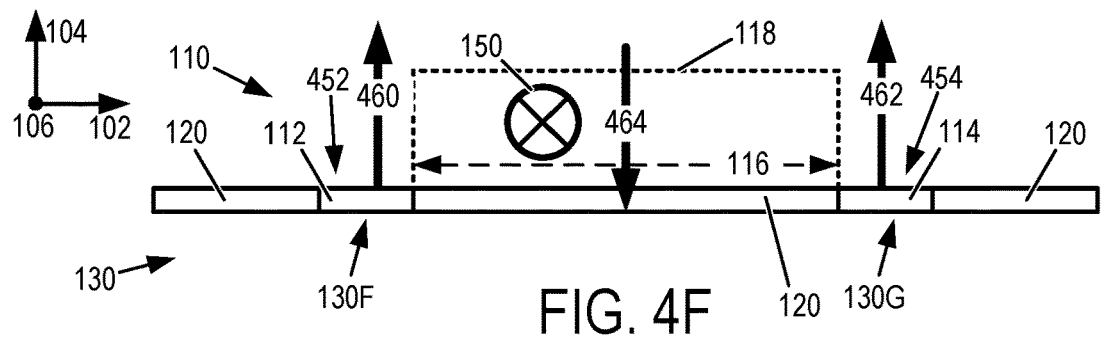

In FIG. 4F, features of air data system 100 are depicted along length axis 106 in a flow direction of air stream 150. In this example, the set of one or more magnets 130 includes a first subset of one or more magnets 130F integrated with first electrode 112 to form a first combined magnet-electrode 452. The set of one or more magnets 130 further includes a second subset of one or more magnets 130G integrated with second electrode 114 to form a second combined magnet-electrode 454. First combined magnet-electrode 452 and second combined magnet-electrode 454 each project outward along height axis 104 from an exterior surface of body 120. The first subset of magnets 130F producing a first magnetic field vector 460 and the second subset of magnets 130G producing a second magnetic field vector 462 are arranged on opposite sides of air gap 118. Within air gap 118, a resultant magnetic field vector 464 is formed by a combination of magnetic field vectors 460 and 462. Resultant magnetic field vector 464 is parallel to height axis 104, and is orthogonal to both first dimension 116 and air stream 150 in this example.

Figure 4G:
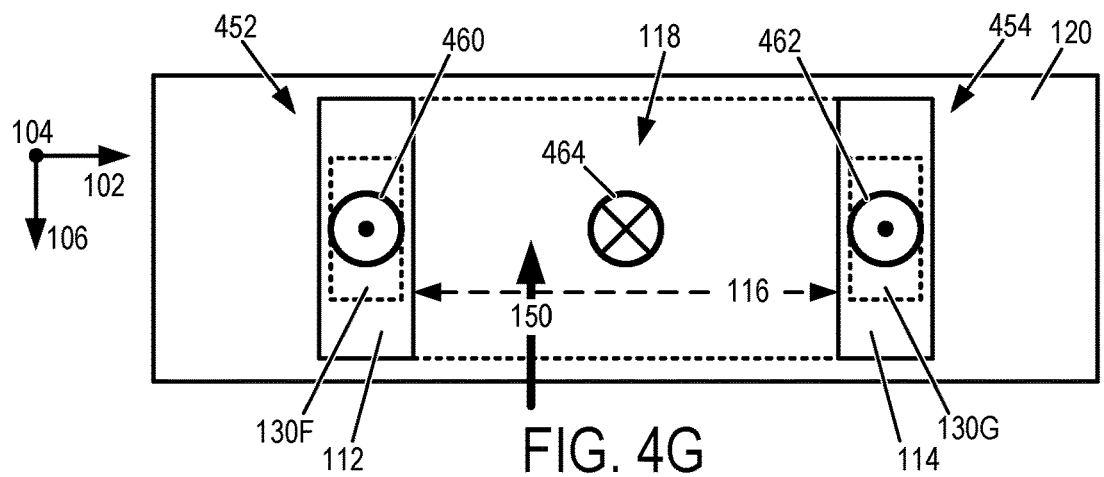
Figure 4H:
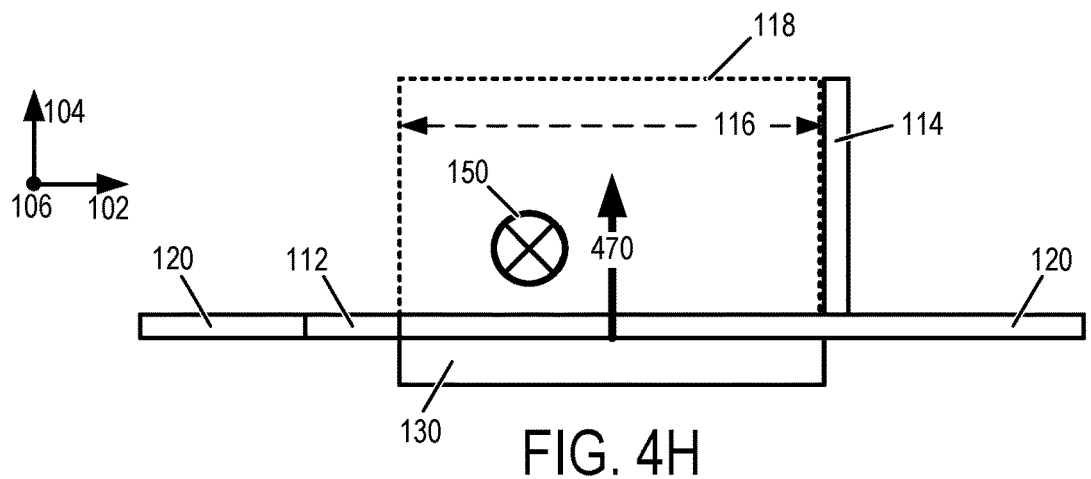

In FIG. 4G, features of air data system 100, including first combined magnet-electrode 452 and second combined magnet-electrode 454 of FIG. 4F are depicted in a plan view. First combined magnet-electrode 452 includes an example configuration of first electrode 112 and the first subset of magnets 130F. Second combined magnet-electrode 454 includes an example configuration of second electrode 114 and the second subset of magnets 130G.

In FIG. 4II, features of air data system 100 are depicted along length axis 106 in a flow direction of air stream 150. In this example, first electrode 112 is flush-mounted with an exterior surface of a body 120. Second electrode 114 projects outward along height axis 104 from an exterior surface of body 120. The set of magnets 130 are arranged relative to air gap 118 along first dimension 116 between first electrode 112 and second electrode 114 on a side of the air gap shared with body 120. An example magnetic field vector 470 is produced by the set of magnets 130 within air gap 118. Magnetic field vector 470 is parallel to height axis 104, and is orthogonal to both first dimension 116 and air stream 150 in this example.

Figure 5A:
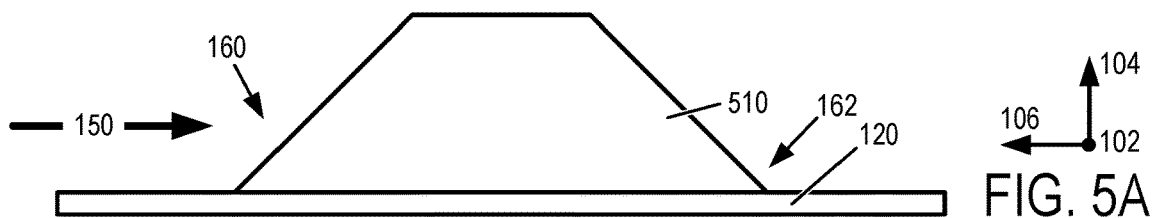
FIGS. 5A-5F are schematic representations of example electrode configurations for the air data system.

FIGS. 5A-5F are schematic representations of example electrode configurations for air data system 100. FIG. 5A depicts an example electrode 510 in a profile view mounted to body 120. Instances of electrode 510 may be used for first electrode 112 and second electrode 114 of air data system 100. Air stream 150 is depicted in relation to electrode 510. In this example, electrode 510 projects outward along height axis 104 from an exterior surface of body 120, and includes a tapered leading edge at upstream side 160 and a tapered trailing edge at downstream side 162.

Figure 5B:
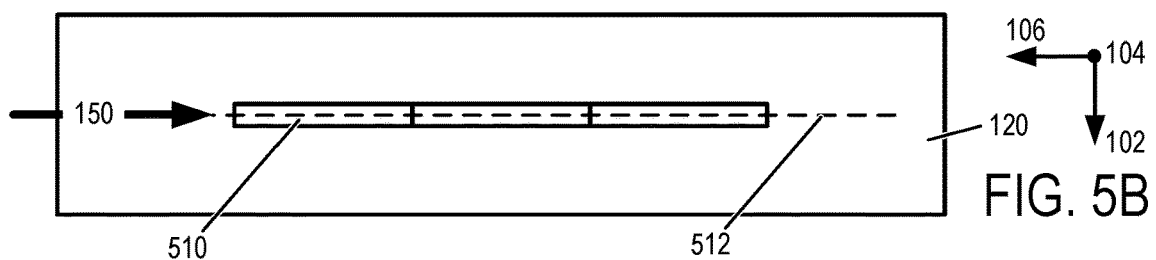

FIG. 5B depicts electrode 510 of FIG. 5A in a profile view mounted to body 120. In this example, electrode 510 forms a fin that is thinner in a width dimension as measured along width axis 102 as compared to its length and height dimensions measured along length axis 106 and height axis 104, respectively. Further, in this example, electrode 510 is symmetric about a midplane 512.

Figure 5C:
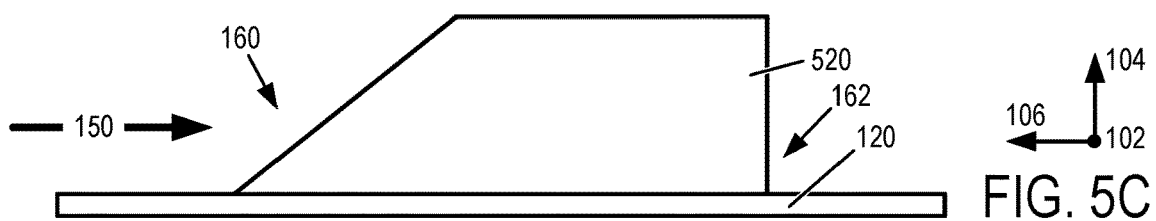

FIG. 5C depicts an example electrode 520 in a profile view mounted to body 120. Instances of electrode 520 may be used for first electrode 112 and second electrode 114 of air data system 100. An example air stream 150 is depicted in relation to electrode 520. In this example, electrode 520 projects outward along height axis 104 from an exterior surface of body 120, and includes a tapered leading edge at upstream side 160 and non-tapered trailing edge that is parallel to height axis 104 at downstream side 162.

Figure 5D:
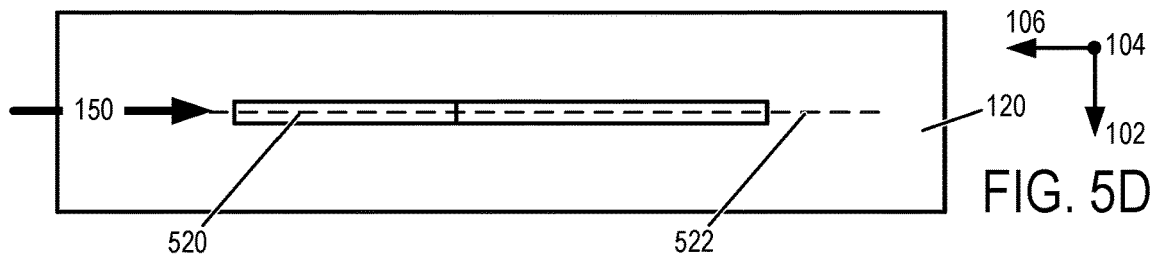

FIG. 5D depicts electrode 520 of FIG. 5C in a profile view mounted to body 120. In this example, electrode 520 forms a fin that is thinner in a width dimension as measured along width axis 102 as compared to its length and height dimensions measured along length axis 106 and height axis 104, respectively. Further, in this example, electrode 520 is symmetric about a midplane 522.

Figure 5E:
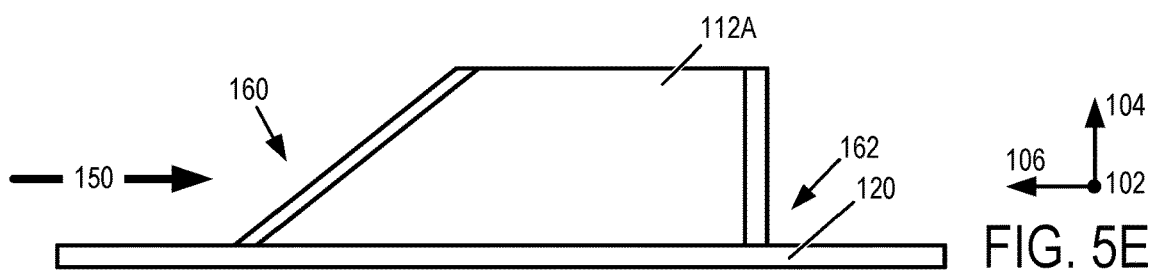

FIG. 5E depicts a first electrode 112A in a profile view as an example of previously described first electrode 112 of air data system 100 mounted to body 120. Air stream 150 is depicted in relation to electrode 112A. In this example, electrode 112A projects outward along height axis 104 from an exterior surface of body 120. Electrode 112A tapers within a plane formed by height axis 104 and length axis 106 along a leading edge at upstream side 160. Additionally, electrode 112A tapers within a plane formed by width axis 102 and length axis 106 along the leading edge at upstream side 160. At downstream side 162, a trailing edge of electrode 112A tapers within a plane formed by width axis 102 and length axis 106. Electrode 112A does not taper within a plane formed by height axis 104 and length axis 106 along the trailing edge at downstream side 162.

Figure 5F:
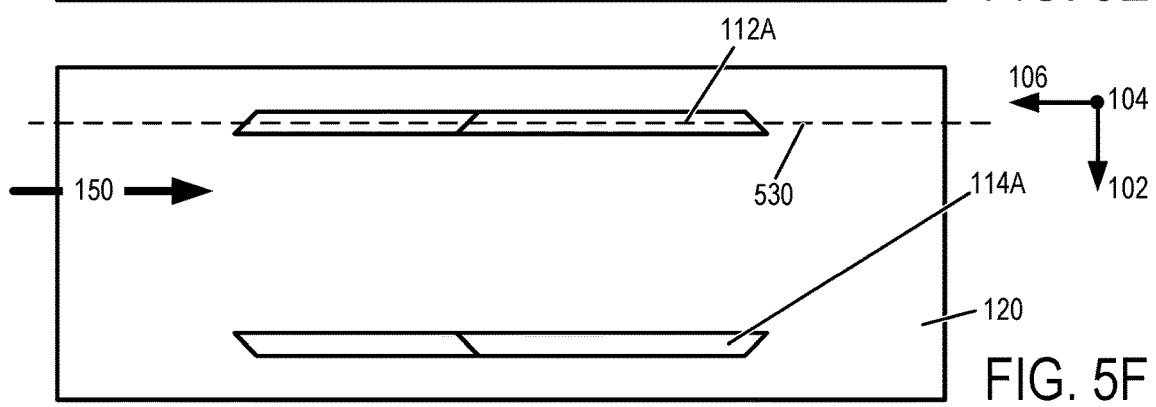

FIG. 5F depicts features of air data system 100 with first electrode 112A of FIG. 5E and additionally with a second electrode 114A as an example of previously described second electrode 114. Leading and trailing edges of electrode 112A are depicted in FIG. 5F as being tapered in a plane formed by width axis 102 and length axis 106. In this example, the leading and trailing edges of first electrode 112A taper away from second electrode 114A. Second electrode 114A is spaced apart from first electrode 112A as measured along width axis 102. In an example, second electrode 114A takes the form of an instance of first electrode 112A that is mirrored about midplane 530 of the first electrode. Each of first electrode 112A and second electrode 114A form a fin that is thinner in a width dimension as measured along width axis 102 as compared to the length and height dimensions measured along length axis 106 and height axis 104, respectively.

While the examples of FIGS. 5A-5F depict various example electrode configurations, the pair of electrodes 110 of an air data system 100 may have other suitable configurations. In an example, the various tapered leading edges and/or tapered trailing edges may be formed by curved surfaces rather than the linear surfaces. In another example, the pair of electrodes may be rectangular, triangular, semi-circular, or of other suitable shape as viewed in profile along width axis 102.

Figure 6:
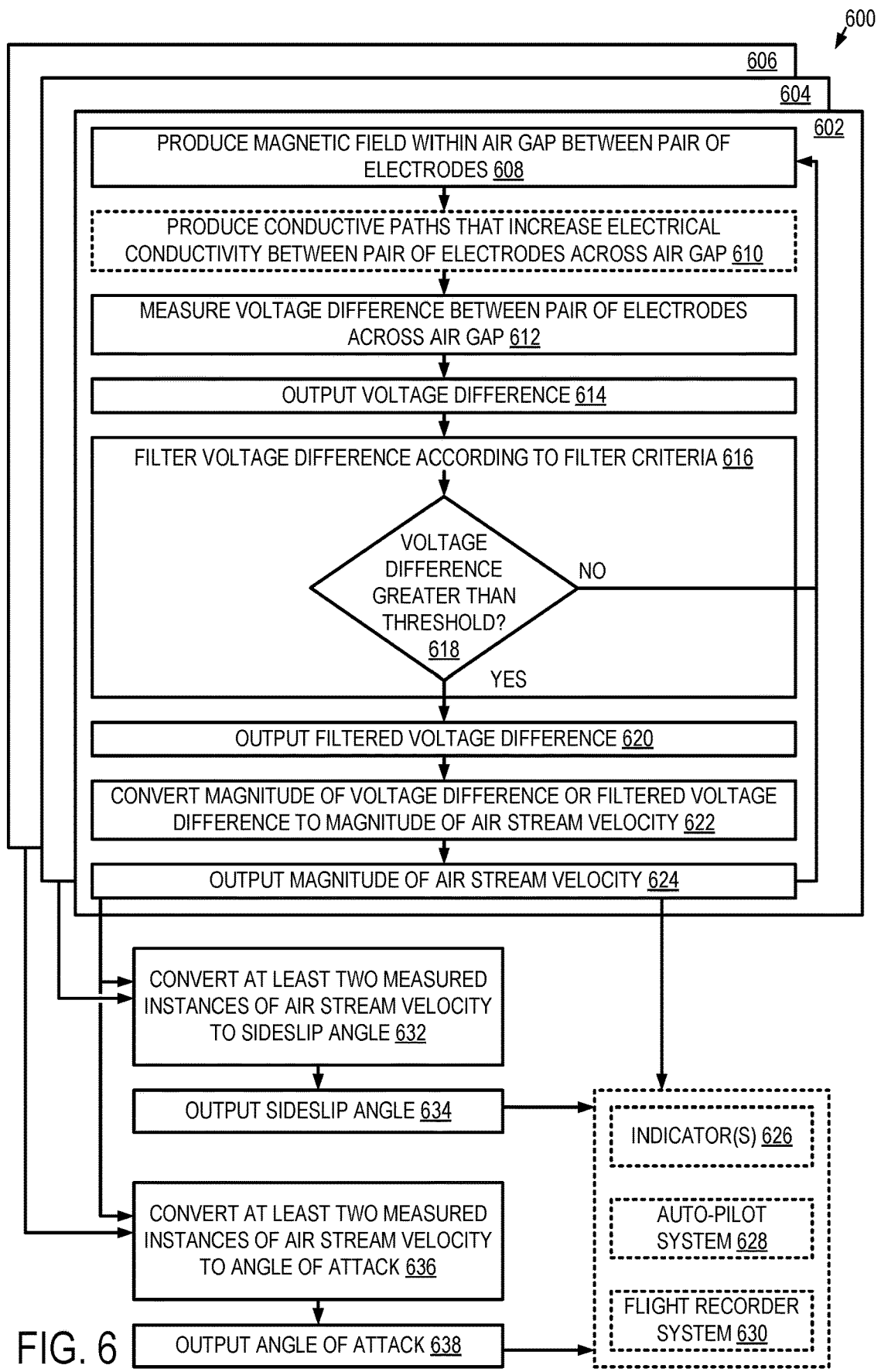
FIG. 6 is a flow diagram depicting example operations performed with respect to the air data system.

FIG. 6 is a flow diagram depicting example operations 600 performed with respect to air data system 100. Operations 600 or portions thereof may be performed by control subsystem 148 associated with one or more instances of air data system 100. An example control subsystem is described in further detail with reference to FIG. 8.

In at least some examples, multiple instances of air data system 100 having different orientations relative to each other may be used in combination to obtain measurements of airspeed, sideslip angle, and angle of attack. Operations 608-624 described in further detail below may be performed as a subroutine for each instance of air data system 100. For example, a first subroutine 602 of operations 608-624 may be performed with respect to a first instance of air data system 100, a second subroutine 604 of operations 608-624 may be performed with respect to a second instance of air data system 100, and a third subroutine 606 of operations 608-624 may be performed with respect to a third instance of air data system 100.

Operation 608 includes producing a magnetic field within an air gap between a pair of electrodes of the air data system. A set of one or more magnets arranged relative to the pair of electrodes may produce a magnetic field that has a magnetic field vector component that is orthogonal to a width dimension of the air gap between the pair of electrodes. The set of magnets may include one or more permanent magnets that have a persistent magnetic field and/or one or more electro-magnets that produce a magnetic field in response to an applied current. In the case of electro-magnets, operation 608 may include applying a current to the electro-magnets to produce the magnetic field within the air gap.

Operation 610 includes producing one or more conductive paths that increase electrical conductivity between the pair of electrodes across the air gap of the air data system. As an example, the electrical conductivity may be increased between the pair of electrodes across the air gap by emitting, into the air gap via one or more conductive path sources, one or more of electro-magnetic radiation, ionizing radiation, and/or an electron beam. Example conductive path sources are described in further detail with reference to FIGS. 3A-3D.

As another example, the electrical conductivity may be increased between the pair of electrodes across the air gap by applying a second voltage difference to a second pair of electrodes arranged in the air stream on an upstream side of the pair of electrodes across which the voltage difference is to be measured. An example of a second pair of electrodes used to increase electrical conductivity across an air gap is described in further detail with reference to FIG. 3E.

Operation 610 may not be performed in at least some examples, such as where sufficient background conductivity is present in the air stream to induce a voltage difference of sufficient magnitude. Feedback of measured voltage between the pair of electrodes may be used to determine whether electrical conductivity across the air gap is to be increased at operation 610.

Operation 612 includes measuring a voltage difference between the pair of electrodes across the air gap of the air data system. The voltage difference may be measured by an electronic circuit of the air data system, such as previously described electronic circuit 140 of FIG. 1. Operation 614 includes outputting the voltage difference measured between the pair of electrodes across the air gap.

Operation 616 includes filtering the voltage difference measured between the electrodes across the air gap according to one or more filter criteria to obtain a filtered voltage difference. For example, if at operation 618, a magnitude of the voltage difference measured between the pair of electrodes across the air gap is greater than a threshold value, the process flow proceeds to operation 620. If at operation 618, a magnitude of the voltage difference measured between the pair of electrodes across the air gap is not greater than the threshold value, the process flow returns to operation 608 where a magnetic field is produced within the air gap. Operation 620 includes outputting a filtered voltage difference. In at least some examples, filtering may not be performed at 616.

Operation 622 includes converting a magnitude of the voltage difference or the filtered voltage difference (depending whether filtering is performed at operation 620) to a magnitude of an air stream velocity through the air gap. In an example, the magnitude of the voltage difference or filtered voltage difference is converted to the magnitude of the air stream velocity through the air gap based on a pre-established relationship between the magnitude of the air stream velocity and the magnitude of the voltage difference or the filtered voltage difference. This pre-established relationship may be obtained from testing and calibration of the air data system, and may be stored in a computer memory device or implemented by a hardware component that is configured to perform the conversion.

Operation 624 includes outputting the magnitude of the air stream velocity through the air gap corresponding to the measured airspeed. The magnitude of the air stream velocity (i.e., the airspeed) may be output to one or more indicators 626 (e.g., an airspeed indicator), an auto-pilot system 628, an electronic flight recorder system 630, and/or other suitable downstream components or processes. For example, a first instance of the magnitude of the air stream velocity output by subroutine 602 that is measured using a first instance of air data system 100 may be combined at operation 632 with a second instance of the magnitude of the air stream velocity output by subroutine 604 measured using a second instance of air data system 100 to convert the first and second measured instances of air stream velocity to a sideslip angle. As another example, the first measured instance of the magnitude of the air stream velocity output by subroutine 602 may be combined at operation 636 with a third instance of the magnitude of the air stream velocity output by subroutine 606 measured using a third instance of air data system 100 to convert the first and third measured instances of air stream velocity to an angle of attack. From operation 624, the process flow may return to operation 608 to obtain additional measurements of air stream velocity.

The voltage measured between the pair of electrodes 110 of air data system 100 is greatest when the air stream is orthogonal to width dimension 116 that separates the electrodes, and the voltage diminishes in proportion to the cosine of the angle of the air stream from this orthogonal orientation. As shown by the equation $V=\int_{D1}^{D2}(v_{air}(D) \times B(D)) \cdot dD$, the voltage between electrodes 112 and 114 is proportional to the dot product of width dimension 116 between the electrodes with the cross product of the air stream vector and the magnetic field vector. Accordingly, two instances of air data system 100, with width dimension 116 oriented at different angles relative to each other, produce different voltages within an air stream. Voltages measured via these two instances of the air data system may be calibrated for their respective orientations to determine the sideslip angle at 632 or the angle of attack at 636 of an aeronautical vehicle in addition to the measured airspeed.

As an example, the airspeed and the angle of attack may be determined at operation 636 from voltages measured by two instances of air data system 100 mounted on a vertical surface at one side of a fuselage of an aeronautical vehicle, with width dimension 116 of the first instance of the air data system orientated vertically and width dimension 116 of the second instance of the air data system orientated at a forward angle (e.g., 15 degrees) relative to vertical. An example of this configuration is described in further detail with reference to air data systems 100A and 100B of FIG. 7. The angle of attack determined at 636 may be output at 638 to one or more indicators 626 (e.g., an angle of attack indicator), auto-pilot system 628, electronic flight recorder system 630, and/or other suitable downstream components or processes.

Continuing with the above example, the airspeed and the sideslip angle may be determined at operation 632 from voltages measured by the first instance of air data system 100 and a third instance of air data system 100 mounted on the fuselage having width dimension 116 orientated horizontally relative to the vertical orientation of the width dimension 116 of the first instance of air data system 100. An example of this configuration is described in further detail with reference to air data systems 100A and 100C of FIG. 7. The sideslip angle determined at 632 may be output at 634 to one or more indicators 626 (e.g., a sideslip angle indicator), auto-pilot system 628, electronic flight recorder system 630, and/or other suitable downstream components or processes.

FIG. 7 is an illustration of an example aeronautical vehicle 700 incorporating multiple instances of air data system 100. In this example, aeronautical vehicle 700 takes the form of an aircraft having a body 702. Aeronautical vehicle 700 includes multiple instances of air data system 100 at a variety of locations indicated at 710, 712, 714, 716, 718, and 720 in relation to body 702. For example, instances of air data system 100 may be located along a nose and/or side of a fuselage of aeronautical vehicle 700 as indicated at 710 and 712, along an upper side of the fuselage as indicated at 714, along an underside of the fuselage as indicated at 716, along a wing surface as indicated at 718, along a vertical stabilizer surface as indicated at 720, or at other suitable locations.

A first instance 100A of air data system 100 is depicted in further detail by an expanded view of location 710. Air stream 150 is depicted flowing in relation to air gap 118 of first instance 100A formed between first electrode 112 and second electrode 114 that are spaced apart from each other along first dimension 116. In this example, first dimension 116 is generally orientated orthogonal to a primary flight direction of aeronautical vehicle 700. FIG. 7 further depicts an example magnetic field vector "B" produced within air gap 118 by one or more magnets of first instance 100A. Width axis 102A, height axis 104A, and length axis 106A for first instance 100A are also depicted within the expanded view of location 710, in which first dimension 116 is parallel to width axis 102A and magnetic field vector "B" is parallel to height axis 104A. In this example, magnetic field vector "B" is orthogonal to (or includes a vector component that is orthogonal to) both air stream 150 and first dimension 116, enabling the magnetic field vector "B" to induce a voltage between first electrode 112 and second electrode 114 that indicates or is representative of the velocity of air stream 150 measured at the particular orientation of instance 100A.

A second instance 100B of air data system 100 is depicted in further detail within FIG. 7 by an expanded view of location 712. Air stream 150 is again depicted flowing in relation to air gap 118 of second instance 100B formed between first electrode 112 and second electrode 114 that are spaced apart from each other along first dimension 116. FIG. 7 further depicts an example magnetic field vector "B" produced within air gap 118 by one or more magnets of second instance 100B. Width axis 102B, height axis 104B, and length axis 106B for second instance 100B are also depicted within the expanded view of location 712, in which first dimension 116 is parallel to width axis 102B and magnetic field vector "B" is parallel to height axis 104B. In this example, magnetic field vector "B" of second instance 100B is orthogonal to (or includes a vector component that is orthogonal to) both air stream 150 and first dimension 116, enabling the magnetic field vector "B" to induce a voltage between first electrode 112 and second electrode 114 that indicates or is representative of the velocity of air stream 150 measured at the particular orientation of instance 100B.

A third instance 100C of air data system 100 is depicted in further detail within FIG. 7 by an expanded view of location 716. Air stream 150 is again depicted flowing in relation to air gap 118 of third instance 100C formed between first electrode 112 and second electrode 114 that are spaced apart from each other along first dimension 116. FIG. 7 further depicts an example magnetic field vector "B" produced within air gap 118 by one or more magnets of third instance 100C. Width axis 102C, height axis 104C, and length axis 106C for third instance 100C are also depicted within the expanded view of location 716, in which first dimension 116 is parallel to width axis 102C and magnetic field vector "B" is parallel to height axis 104C. In this example, magnetic field vector "B" is orthogonal to (or includes a vector component that is orthogonal to) both air stream 150 and first dimension 116, enabling the magnetic field vector "B" to induce a voltage between first electrode 112 and second electrode 114 that indicates or is representative of the velocity of air stream 150 measured at the particular orientation of instance 100C.

Furthermore, in the example depicted in FIG. 7, first instance 100A, second instance 100B, and third instance 100C are each orientated at an angle relative to each other, thereby enabling airspeed, sideslip angle, and angle of attack of the aeronautical vehicle to be measured. For example, width axis 102B of second instance 100B is orientated at an angle 730 relative to width axis 102A of first instance 100A. In this configuration, voltages measured by instances 100A and 100B are used to determine airspeed and angle of attack. Within the example of FIG. 7, the angle of attack is measured within a plane formed by width axis 102A and length axis 106A. In an example, angle 730 is 90 degrees or less. As a more specific example, angle 730 may be 15 degrees. However, other suitable angles between two instances of air data system 100 may be used.

Width axis 102C of third instance 100C is orientated at an angle 732 relative to width axis 102A of first instance 100A. In this configuration, voltages measured by instances 100A and 100C are used to determine airspeed and sideslip angle. Within the example of FIG. 7, sideslip angle is measured within a plane formed by height axis 104A and length axis 106A. In an example, angle 732 is 90 degrees or less. However, other suitable angles between two instances of air data system 100 may be used.

Figure 8:
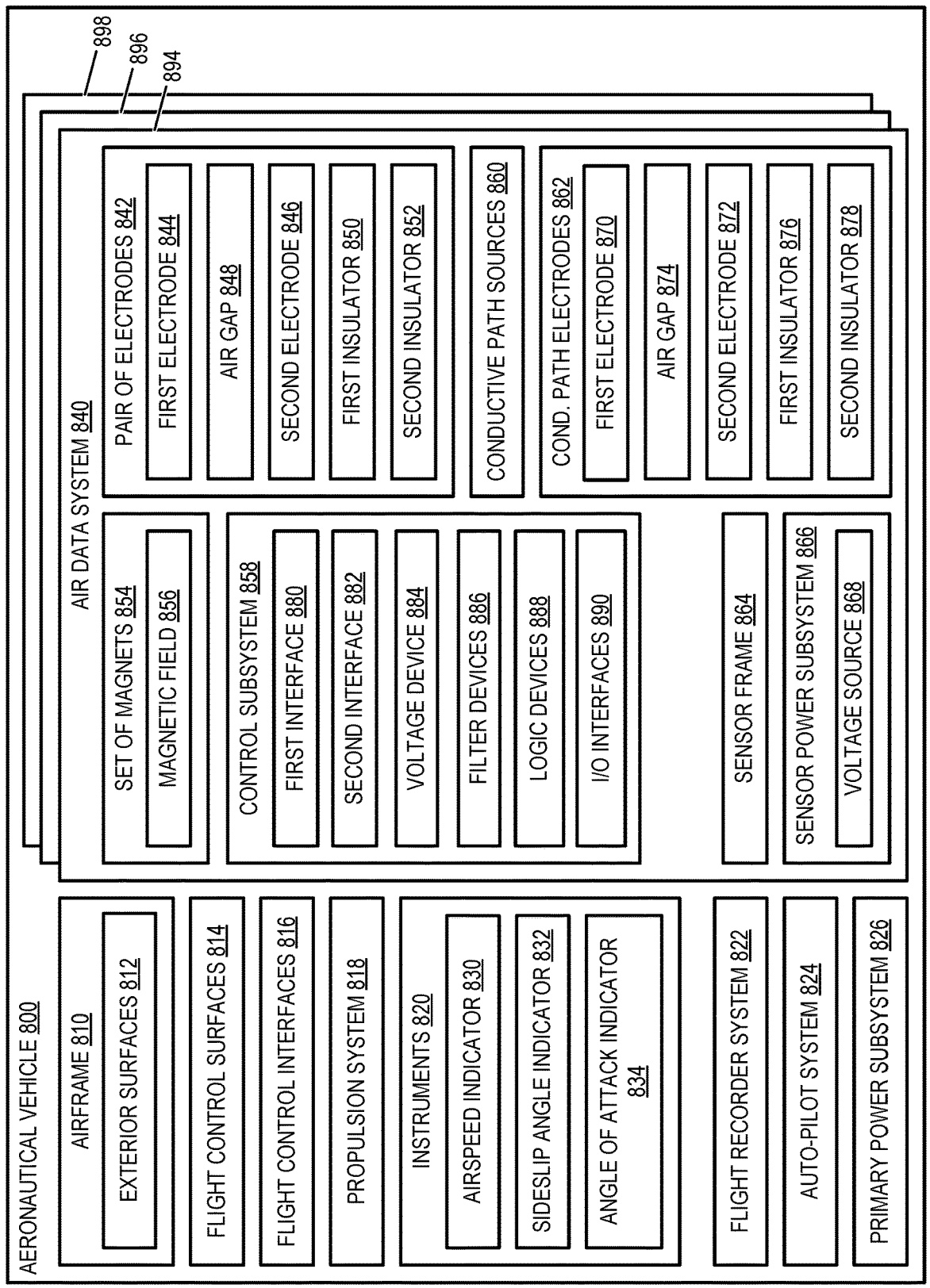
FIG. 8 depicts a schematic representation of an example aeronautical vehicle incorporating an air data system, which may include the air data system of FIG. 1.

FIG. 8 depicts a schematic representation of an example aeronautical vehicle 800 incorporating an air data system 840. Air data system 840 is an example of previously described air data system 100. Aeronautical vehicle 700 of FIG. 7 configured as an aircraft is one example of aeronautical vehicle 800. However, aeronautical vehicle 800 may take other forms, including a rocket, a missile, a helicopter, a glider, an unmanned aerial vehicle, etc. Air data system 840 may be one of a plurality of air data systems on board aeronautical vehicle 800 and may refer to any of the example air data systems described herein.

Aeronautical vehicle 800 includes a body, such as an airframe 810 having exterior surfaces 812, flight control surfaces 814, flight control interfaces 816 (e.g., pilot controls and/or auto-pilot control interfaces), a propulsion system 818, instruments 820, an electronic flight recorder system 822, an auto-pilot system 824, a primary power subsystem 826, and an air data system 840, among other suitable components. Each of these components may be mounted to airframe 810. In an example, propulsion system 818 provides the aeronautical vehicle with supersonic or hypersonic flight. Instruments 820 include an airspeed indicator 830, a sideslip angle indicator 832, and an angle of attack indicator 834. Primary power subsystem 826 may include an on-board electrical energy source, such as a storage device (e.g., battery) and/or generator.

Air data system 840 includes a pair of electrodes 842 including a first electrode 844 and a second electrode 846. First electrode 844 is spaced apart from second electrode 846 by an air gap 848. Air data system 840 includes a set of one or more magnets 854 arranged relative to the pair of electrodes 842. The set of magnets 854 produce a magnetic field 856 within air gap 848. In an example, magnetic field 856 includes a magnetic field vector component that is orthogonal to a width dimension of air gap 848 between first electrode 844 and second electrode 846.

First electrode 844 and second electrode 846 are electrically conductive, enabling a voltage difference to be induced between first electrode 844 and second electrode 846 by magnetic field 856. In at least some examples, first electrode 844 is electrically isolated from airframe 810 and/or the set of magnets 854 by a first insulator 850, and second electrode 846 is electrically isolated from airframe 810 and/or the set of magnets 854 by a second insulator 852.

Air data system 840 may further include one or more conductive path sources 860 and/or one or more conductive path electrodes 862 that are operable to increase an electrical conductivity across air gap 848 between first electrode 844 and second electrode 846. Examples of conductive path sources 860 are described with reference to FIGS. 3A-3D. An example of conductive path electrodes are described with reference to FIG. 3E. As an example, a pair of conductive path electrodes 862 may include a first electrode 870 and a second electrode 872 located upstream from the pair of electrodes 842. Second electrode 872 is spaced apart from first electrode 870 via an air gap 874. First electrode 870 and second electrode 872 are electrically conductive, and may be electrically isolated from airframe 810 via first insulator 876 and second insulator 878, respectively.

Air data system 840 may further include a sensor power subsystem 866 that services the air data system and its various components. Sensor power subsystem 866 may include an on-board electrical energy source, such as a storage device (e.g., battery) and/or generator, and may condition power received from primary power subsystem 826 for use by air data system 840. Sensor power subsystem 866 may provide a voltage source 868 for use by conductive path electrodes 862. Sensor power subsystem 866 may provide power to conductive path sources to produce a conductive path. Sensor power subsystem 866 may provide power in the form of an applied current to one or more electro-magnets of the set of magnets 854 to produce magnetic field 856 or a portion thereof.

Air data system 840 further includes a control subsystem 858, which is an example of previously described control subsystem 148 of FIG. 1. Control subsystem 858 may be formed of one or more electronic circuits. Control subsystem 858 includes a first interface 880 in electrical contact with first electrode 844, a second interface 882 in electrical contact with second electrode 846, and a voltage measurement device 884 that measures a voltage difference between first electrode 844 and second electrode 846 via first interface 880 and second interface 882, respectively. Electronic circuit 140 of FIG. 1 is one example of voltage measurement device 884. Control subsystem 858 may further include one or more filter devices 886 that provide pre-filtering and/or post-filtering of voltage measurements obtained via voltage measurement device 884. An example of voltage filtering is described at operations 616 and 618 of FIG. 6. Filter devices 886 may provide filtering in the form of a low pass filter prior to measuring voltage to remove high frequency voltage variations that may be introduced by use of conductive path sources 860, such as an electron beam emitter or microwave emitter, or by conductive path electrodes 862.

Control subsystem 858 may include one or more logic devices 888 to perform or to control performance of one or more of the operations described herein, including example operations 600 of FIG. 6. Control subsystem 858 and its various components including logic devices 888 may interface with other components of air data system 840 and/or aeronautical vehicle 800 via a set of one or more input/output interfaces 890.

In at least some examples, logic devices 888 may be programmed with instructions executable to implement any of the example operations described herein. In an example, logic devices 888 may include one or more memory devices and one or more computer processors that form a computing system. Such processors execute instructions stored by the memory devices. As another example, logic devices 888 may be integrated with one or more memory devices into one or more hardware-logic components, such as field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs). Memory devices associated with logic devices 888 may include non-volatile memory devices that continue to store instructions and/or data even if power is cut to the non-volatile memory device. As yet another example, logic devices 888 may include an arrangement of electrical components that are configured implement one or more of the operations described herein.

As examples, logic devices 888 may be programmed or otherwise configured to selectively measure a voltage difference between first electrode 844 and second electrode 846 via voltage measurement device 884 according to a schedule, selectively apply filter devices 886 to pre and/or post-filter measured voltages, convert measured voltages to a value indicating an airspeed or air stream velocity, selectively provide measured voltages or values indicating airspeed or air stream velocity to one or more of instruments 820, electronic flight recorder system 822, and auto-pilot system 824, selectively produce conductive paths via conductive path sources 860 and/or conductive path electrodes 862 according to a schedule, selectively produce magnetic field 856 via the set of magnets 854, and manage power supplied to the various components of air data system 840.

Air data system 840 may further include a sensor frame 864 to which the various components of the air data system may be mounted, and by which the air data system may be mounted to airframe 810. In at least some examples, sensor frame 864 may assist in orientating the pair of electrodes 842 and other components in a particular direction in relation to the airframe.

Multiple instances of air data system 840 may be included on board aeronautical vehicle 800. In the example depicted in FIG. 8, aeronautical vehicle 800 includes a first instance 894, a second instance 896, and a third instance 898 of air data system 840. In at least some examples, control subsystem 858 or portions thereof may support two, three, or more instances of air data system 840. For example, logic devices 888 of control subsystem 858 may combine measured voltages or measured air stream velocities of first instance 894, second instance 896, and third instance 898 to determine airspeed, sideslip angle, and angle of attack of aeronautical vehicle 800. Input/output interfaces 890 may receive measured voltages and/or measured air stream velocities of any suitable quantity of air data systems, and may provide signals indicating airspeed, sideslip angle, and angle of attack to instruments 820, flight recorder system 822, and auto-pilot system 824

Airspeed indicator outputs an indication of airspeed provided by control subsystem 858 that is based on the voltage difference output by voltage device 884 of at least one instance (e.g., first instance 894) of air data system 840. Sideslip angle indicator 832 outputs an indication of sideslip angle provided by control subsystem 858 that is based on the voltage difference output by voltage device 884 of at least two instances (e.g., first instance 894 and second instance 896) of air data system 840. Angle of attack indicator 834 outputs an indication of angle of attack provided by control subsystem 858 that is based on the voltage difference output by voltage device 884 of at least two instances (e.g., first instance 894 and third instance 898) of air data system 840.

Examples of the subject matter of the present disclosure are described in the following enumerated paragraphs.

A1. An air data system for an aeronautical vehicle, the air data system comprising: a pair of electrodes, including a first electrode and a second electrode spaced apart from the first electrode along a first dimension by an air gap; one or more magnets arranged relative to the pair of electrodes, wherein the one or more magnets produce a magnetic field within the air gap; and an electronic circuit interfacing with the pair of electrodes, wherein the electronic circuit outputs a voltage difference measured between the pair of electrodes across the air gap, a magnitude of the voltage difference indicating a magnitude of an air stream velocity through the air gap.

A2. The air data system of paragraph A1, further comprising: an electro-magnetic radiation emitter arranged relative to the pair of electrodes to increase an electrical conductivity between the pair of electrodes across the air gap by emitting electro-magnetic radiation into the air gap.

A3. The air data system of any of paragraphs A1-A2, further comprising: an ionizing radiation emitter arranged relative to the pair of electrodes to increase an electrical conductivity between the pair of electrodes across the air gap by emitting ionizing radiation into the air gap.

A4. The air data system of any of paragraphs A1-A3, further comprising: an electron beam emitter arranged relative to the pair of electrodes to increase an electrical conductivity between the pair of electrodes across the air gap by emitting an electron beam into the air gap.

A5. The air data system of any of paragraphs A1-A4, further comprising: a second pair of electrodes arranged on an upstream side of the air gap in a second dimension that is orthogonal to the first dimension; and a voltage source interfacing with the second pair of electrodes that applies a second voltage difference to the second pair of electrodes to increase an electrical conductivity of the air stream flowing between the pair of electrodes through the air gap from the second pair of electrodes on the upstream side of the air gap.

A6. The air data system of any of paragraphs A1-A5, wherein the pair of electrodes project outward from an exterior surface of an airframe of the aeronautical vehicle.

A7. The air data system of paragraph A6, wherein the pair of electrodes are thinner in the first dimension than in second and third dimensions that are orthogonal to the first dimension.

A8. The air data system of paragraph A7, wherein the pair of electrodes each form a fin; and wherein the fins of the pair of electrodes are parallel to each other.

A9. The air data system of any of paragraphs A1-A8, wherein the pair of electrodes are flush-mounted with an exterior surface of an airframe of the aeronautical vehicle that adjoins or surrounds the pair of electrodes.

A10. The air data system of paragraph A9, wherein the one or more magnets are flush-mounted with the exterior surface of the airframe that adjoins or surrounds the one or more magnets.

A11. The air data system of any of paragraphs A1-A10, wherein the one or more magnets form at least a portion of a boundary of the air gap along the first dimension between the pair of electrodes.

A12. The air data system of any of paragraphs A1-A11, wherein the electronic circuit further includes one or more filters that selectively remove measurements of voltage below a predetermined threshold from the voltage difference output by the electronic circuit.

A13. The air data system of any of paragraphs A1-A12, further comprising an airspeed indicator that outputs an indication of airspeed that is based on the voltage difference output by the electronic circuit.

B1. A method of operating an air data system, the method comprising: producing, via one or more magnets, a magnetic field within an air gap between a pair of electrodes; measuring a voltage difference between the pair of electrodes across the air gap; converting a magnitude of the voltage difference to a magnitude of an air stream velocity through the air gap; and outputting the magnitude of the air stream velocity.

B2. The method of paragraph B1, further comprising: increasing an electrical conductivity between the pair of electrodes across the air gap by emitting, into the air gap, one or more of electro-magnetic radiation, ionizing radiation, and/or an electron beam.

B3. The method any of paragraphs B1-B2, further comprising: increasing an electrical conductivity between the pair of electrodes across the air gap by applying a second voltage difference to a second pair of electrodes arranged in the air stream on an upstream side of the pair of electrodes.

B4. The method of any of paragraphs B1-B3, further comprising: filtering the voltage difference measured between the pair of electrodes across the air gap to obtain a filtered voltage difference that exceeds a threshold magnitude; and wherein converting the magnitude of the voltage difference to the magnitude of the air stream velocity through the air gap includes converting the magnitude of the filtered voltage difference that exceeds the threshold magnitude to the magnitude of the air stream velocity.

B5. The method of any of paragraphs B1-B4, wherein the magnitude of the voltage difference is converted to the magnitude of the air stream velocity through the air gap based on a pre-established relationship between the magnitude of the voltage difference and the magnitude of the air stream velocity through the air gap.

C1. An aeronautical vehicle, comprising: an airframe; an air data system mounted to the airframe, the air data system comprising: a pair of electrodes arranged along an exterior surface of the airframe, the pair of electrodes including a first electrode and a second electrode spaced apart from the first electrode along a first dimension by an air gap; one or more magnets arranged on the airframe relative to the pair of electrodes, wherein the one or more magnets produce a magnetic field within the air gap; and an electronic circuit interfacing with the pair of electrodes, wherein the electronic circuit outputs a voltage difference measured between the pair of electrodes across the air gap, a magnitude of the voltage difference indicating a magnitude of an air stream velocity through the air gap.

C2. The aeronautical vehicle of paragraph C1, wherein the air data system is a first air data system, and wherein the aeronautical vehicle further comprises: a second air data system mounted to the airframe, the second air data system comprising: a pair of electrodes arranged along an exterior surface of the airframe, the pair of electrodes including a first electrode and a second electrode spaced apart from the first electrode along a first dimension by an air gap; one or more magnets arranged on the airframe relative to the pair of electrodes, wherein the one or more magnets produce a magnetic field within the air gap; and an electronic circuit interfacing with the pair of electrodes, wherein the electronic circuit outputs a voltage difference measured between the pair of electrodes across the air gap, a magnitude of the voltage difference indicating a magnitude of an air stream velocity through the air gap; and wherein the first dimension of the second air data system is orientated at an angle relative to the first dimension of the first air data system.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples, and may find utility in other implementations not expressly disclosed herein.

The invention claimed is:

1. An air data system for an aeronautical vehicle, the air data system comprising:
a pair of electrodes projecting outward from an exterior surface of an airframe of the aeronautical vehicle, the pair of electrodes including a first electrode and a second electrode spaced apart from the first electrode along a first dimension by an air gap, each electrode of the pair of electrodes forming a fin that is thinner in the first dimension than in second and third dimensions that are orthogonal to each other and to the first dimension;
one or more magnets arranged relative to the pair of electrodes, wherein the one or more magnets produce a magnetic field within the air gap; and
an electronic circuit interfacing with the pair of electrodes, wherein the electronic circuit outputs a voltage difference measured between the pair of electrodes across the air gap, a magnitude of the voltage difference indicating a magnitude of an air stream velocity through the air gap.

2. The air data system of claim 1, further comprising:
an electro-magnetic radiation emitter arranged relative to the pair of electrodes to increase an electrical conductivity between the pair of electrodes across the air gap by emitting electro-magnetic radiation into the air gap.

3. The air data system of claim 1, further comprising:
an ionizing radiation emitter arranged relative to the pair of electrodes to increase an electrical conductivity between the pair of electrodes across the air gap by emitting ionizing radiation into the air gap.

4. The air data system of claim 1, further comprising:
an electron beam emitter arranged relative to the pair of electrodes to increase an electrical conductivity between the pair of electrodes across the air gap by emitting an electron beam into the air gap.

5. The air data system of claim 1, further comprising:
a second pair of electrodes arranged on an upstream side of the air gap in the second dimension that is orthogonal to the first dimension; and
a voltage source interfacing with the second pair of electrodes that applies a second voltage difference to the second pair of electrodes to increase an electrical conductivity of an air stream flowing between the pair of electrodes through the air gap from the second pair of electrodes on the upstream side of the air gap.

6. The air data system of claim 1,
wherein the fins of the pair of electrodes are parallel to each other.

7. The air data system of claim 1, wherein the one or more magnets are flush-mounted with the exterior surface of the airframe that adjoins or surrounds the one or more magnets.

8. The air data system of claim 1, wherein the one or more magnets form at least a portion of a boundary of the air gap along the first dimension between the pair of electrodes.

9. The air data system of claim 1, wherein the electronic circuit further includes one or more filters that selectively remove measurements of voltage below a predetermined threshold from the voltage difference output by the electronic circuit.

10. The air data system of claim 1, further comprising an airspeed indicator that outputs an indication of airspeed that is based on the voltage difference output by the electronic circuit.

11. The air data system of claim 1, wherein the one or more magnets include one or more electro-magnets.

12. A method of operating an air data system, the method comprising:
producing, via one or more magnets, a magnetic field within an air gap between a pair of electrodes;
measuring a voltage difference between the pair of electrodes across the air gap;
converting a magnitude of the voltage difference to a magnitude of an air stream velocity through the air gap;
outputting the magnitude of the air stream velocity; and
increasing an electrical conductivity between the pair of electrodes across the air gap by applying a second voltage difference to a second pair of electrodes arranged in an air stream on an upstream side of the pair of electrodes.

13. The method of claim 12, further comprising:
further increasing the electrical conductivity between the pair of electrodes across the air gap by emitting, into the air gap, one or more of electro-magnetic radiation, ionizing radiation, and/or an electron beam.

14. The method of claim 12, further comprising:
filtering the voltage difference measured between the pair of electrodes across the air gap to obtain a filtered voltage difference that exceeds a threshold magnitude; and
wherein converting the magnitude of the voltage difference to the magnitude of the air stream velocity through the air gap includes converting the magnitude of the filtered voltage difference that exceeds the threshold magnitude to the magnitude of the air stream velocity.

15. The method of claim 12, wherein the magnitude of the voltage difference is converted to the magnitude of the air stream velocity through the air gap based on a pre-established relationship between the magnitude of the voltage difference and the magnitude of the air stream velocity through the air gap.

16. An aeronautical vehicle, comprising:
an airframe;
an air data system mounted to the airframe, the air data system comprising:
  a pair of electrodes projecting outward from an exterior surface of the airframe, the pair of electrodes including a first electrode and a second electrode spaced apart from the first electrode along a first dimension by an air gap, each electrode of the pair of electrodes forming a fin that is thinner in the first dimension than in second and third dimensions that are orthogonal to each other and to the first dimension;
    one or more magnets arranged on the airframe relative to the pair of electrodes, wherein the one or more magnets produce a magnetic field within the air gap; and
    an electronic circuit interfacing with the pair of electrodes, wherein the electronic circuit outputs a voltage difference measured between the pair of electrodes across the air gap, a magnitude of the voltage difference indicating a magnitude of an air stream velocity through the air gap.

17. The aeronautical vehicle of claim 16, wherein the air data system is a first air data system, and wherein the aeronautical vehicle further comprises:
a second air data system mounted to the airframe, the second air data system comprising:
  a pair of electrodes arranged along an exterior surface of the airframe, the pair of electrodes of the second air data system including a first electrode and a second electrode spaced apart from the first electrode of the second air data system along a first dimension by an air gap;
    one or more magnets arranged on the airframe relative to the pair of electrodes of the second air data system, wherein the one or more magnets of the second air data system produce a magnetic field within the air gap of the second air data system; and
    an electronic circuit interfacing with the pair of electrodes of the second air data system, wherein the electronic circuit of the second air data system outputs a voltage difference measured between the pair of electrodes of the second air data system across the air gap of the second air data system, a magnitude of the voltage difference of the second air data system indicating a magnitude of an air stream velocity through the air gap of the second air data system; and
  wherein the first dimension of the second air data system is orientated at an angle relative to the first dimension of the first air data system.

18. The aeronautical vehicle of claim 17, wherein the pair of electrodes of the second air data system are flush-mounted with the exterior surface of the airframe.

19. The aeronautical vehicle of claim 16, wherein the one or more magnets of the air data system form at least a portion of a boundary of the air gap along the first dimension between the pair of electrodes of the air data system.

20. The aeronautical vehicle of claim 16, wherein the one or more magnets include one or more electro-magnets.

* * * * *